United States Patent [19]

Brown et al.

[11] Patent Number: 4,724,317

[45] Date of Patent: Feb. 9, 1988

[54] OPTICAL DATA COLLECTION APPARATUS AND METHOD USED WITH MOVING MEMBERS

[75] Inventors: Richard I. Brown, Northbrook; John T. Foley, Wheeling, both of Ill.

[73] Assignee: Baxter Travenol Laboratories, Inc., Deerfield, Ill.

[21] Appl. No.: 805,512

[22] Filed: Dec. 5, 1985

[51] Int. Cl.$^4$ .............................................. G01D 5/34
[52] U.S. Cl. ................................. 250/231 SE; 494/10
[58] Field of Search ........ 250/231 R, 231 SE, 237 G, 250/227, 226; 356/23, 24, 395; 494/9, 10

[56] References Cited

U.S. PATENT DOCUMENTS

| | | | |
|---|---|---|---|
| 2,454,959 | 11/1948 | Barnes | 356/24 |
| 3,471,236 | 10/1969 | Pearson | 356/24 |
| 4,162,399 | 7/1979 | Hudson | 250/231 SE |
| 4,205,261 | 5/1980 | Franklin | 494/10 |
| 4,387,299 | 6/1983 | Akiyama | 250/231 SE |
| 4,449,191 | 5/1984 | Mehnert | 250/231 SE |
| 4,507,110 | 3/1985 | Boeckel | 494/10 |
| 4,530,691 | 7/1985 | Brown | 494/45 |

*Primary Examiner*—David C. Nelms
*Attorney, Agent, or Firm*—Paul C. Flattery; Bradford R. L. Price; Paul M. Vargo

[57] ABSTRACT

A non-contact apparatus is provided for acquiring velocity information off of an internal rotating housing of an Adams-type centrifuge. The apparatus includes a bidirectional transmitter of radiant energy, such as a fiber-optic member, positioned at the axis of rotation of the exterior rotatable housing of the centrifuge. An inner end of the fiber-optic member is positioned adjacent a lower surface of the inner rotatable housing. A ring of reflective, spaced-apart, members is formed on the lower surface of the rotatable housing adjacent the end of the fiber-optic member. Radiant energy from an exterior, fixed, light source is transmitted through the fiber-optic member and is incident upon the rotating ring. Radiant energy reflected off of the reflecting members of the ring passes back through the fiber-optic member and can be sensed in an externally located, stationary optical sensor. The optical sensor generates a train of electrical pulses in response to the incident pulses of reflected radiant energy. The rate of the electrical pulses can be compared to a set point to determine the velocity of the internal motor. Tachometer signals can be acquired off of the outer motor which rotates the outer housing. A control system can process the velocity signals from the internal motor and the outer motor and provide feedback signals thereto for the purpose of causing the internal motor and internal housing to rotate at twice the speed of the outer motor and outer housing.

64 Claims, 14 Drawing Figures

OPTICAL DATA COLLECTION APPARATUS AND METHOD USED WITH MOVING MEMBERS

FIELD OF THE INVENTION

The invention pertains to non-contact systems, for collecting data off of a moving member and for bringing that data to a non-moving location. More particularly, the invention pertains to non-contact sensing systems usable with dual housing centrifuges wherein an outer housing is rotated at a first rotational velocity and an inner housing is rotated at a higher rotational velocity, usually twice that of the outer housing.

BACKGROUND OF THE INVENTION

In recent years, processing of whole blood from a donor has come to routinely include separating the blood into therapeutic components. These components include red blood cells, platelets and plasma. Various techniques and apparatus have been developed to facilitate the collection of whole blood and the subsequent separation of therapeutic components therefrom.

One consideration in the processing of whole blood is the requirement that the processing take place under sterile conditions. A second consideration involves the requirement that unless the processing takes place within a single sealed system, the permitted storage duration and usable lifetime of the blood components is substantially shortened. Components processed within a sealed system can be stored for four to six weeks or longer before use. On the other hand, whole blood or components thereof must be used within 24 hours if the system seal is broken.

One very common step in the processing of whole blood into various therapeutic components includes centrifuging the blood so as to bring about the desired separation of those components.

To promote the desired ends of sterile processing within a single sealed system, a family of dual housing centrifuges has been developed. One example of this type of centrifuge is disclosed in U.S. Pat. No. Re. 29,738 to Adams entitled "Apparatus for Providing Energy Communication Between a Moving and a Stationary Terminal."

The Adams patent discloses a centrifuge having an outer rotatable housing and an inner rotatable housing. The inner housing is positioned within and rotatably supported by the outer housing.

The outer housing rotates at one rotational velocity, usually called one omega, and the inner rotatable housing rotates at twice the rotational velocity of the outer housing or two omega. There is thus a one omega difference in rotational speed of the two housings.

The centrifuge of the Adams patent is particularly advantageous in that no seals are needed between moving and non-moving parts. Further, the system of the Adams patent, provides for the processing of blood into components in a single sealed system wherein whole blood from a donor can be infused into the centrifuge while the two housings of the centrifuge are being rotated.

The system of the Adams patent uses a single motor coupled by gears and shafts to the two housings so as to provide the desired speed synchronization. This is an open loop system.

While the centrifuge of the Adams patent provides an apparatus wherein blood processing may take place in a single sealed sterile system, the mechanical apparatus of the Adams patent is subject to wear of the type normally experienced with gear driven systems. Hence, centrifuges in accordance with Adams disclosure must be built as precision mechanical systems. Since it is an open loop system, care must be exercised to insure that the two chambers do in fact continually operate at the desired speeds.

An alternate to the mechanical apparatus of the Adams patent is illustrated in U.S. Pat. No. 4,056,224 to Lolachi entitled "Flow System for Centrifugal Liquid Processing Apparatus." The system of the Lolachi patent includes a dual chamber centrifuge of the Adams type. The outer housing of the Lolachi centrifuge is rotated by a single electric motor which is coupled to the internal rotatable housing by belts and shafts.

The Lolachi mechanism, as was the case with the Adams mechanism, is an open loop, essentially mechanical, structure for driving the two rotatable housings. U.S. Pat. Nos. 3,986,442 and 4,113,173 illustrate alternate, open loop drive systems.

U.S. Pat. No. 4,108,353 to Brown entitled "Centrifugal Apparatus With Oppositely Positioned Rotational Support Means" discloses a centrifuge structure of the Adams type which includes two separate electrical motors. One electric motor is coupled by a belt to the outer housing and rotates the outer housing at a desired nominal rotational velocity. The second motor is carried within the rotating exterior housing and rotates the inner housing at the desired higher velocity, twice that of the exterior housing.

Tachometer feedback is provided from the second motor through a set of slip rings or brushes for the purpose of continuously controlling the speed of the second motor with respect to the first motor. The structure of the Brown patent thus provides for obtaining electrical signals corresponding to the velocity of the inner motor for the purpose of continually controlling the speed thereof by means of a closed loop control system.

U.S. Pat. No. 4,109,855 to Brown et al. entitled "Drive System For Centrifugal Processing Apparatus" discloses yet another drive system. The system of the Brown et al. patent has an outer shaft, affixed to the outer housing for rotating the outer housing at a selected velocity. An inner shaft, coaxial with the outer shaft, is coupled to the inner housing. The inner shaft rotates the inner housing at twice the rotational velocity as the outer housing. The mechanism of the Brown et al. patent is an open loop system.

A further alternate to the Adams structure is illustrated in U.S. Pat. No. 4,530,691 to Richard I. Brown entitled "Centrifuge With Movable Mandrel." The specification and figures of this Brown patent are hereby incorporated by reference herein. The centrifuge of this latter Brown patent also is of the Adams-type. However, this latter centrifuge has an exterior housing which is hinged for easy opening. When the hinged upper section is pivoted away from the bottom section, it carries the rotatable inner housing along with it.

The inner housing supports internally therein a spring biased mandrel which continually presses against a sealed, blood containing, container positioned within the inner housing. The system of this latter Brown patent also discloses the use of two separate electric motors to rotate the inner and outer housings. The motors are coupled to a control system.

Thus, while it is known from the prior art to use two independent motors in connection with a control system to rotate the dual housings of an Adams-type centrifuge, there are no known non-contact systems for acquiring or collecting velocity information from the inner rotating housing. Additionally, none of the prior art systems have provided control information concerning the direction of rotation of the inner housing.

Further, it has long been known from the manual centrifuge operations by which whole blood has been processed that when the blood is subjected to the centrifuge processing, the red blood cells become packed in one portion of the sealed container and are separated from the plasma. An optically discernible interface appears between the separated plasma and packed red blood cell components.

In view of the fact that the inner housing of the Adams-type centrifuge is usually positioned within the outer housing, it is not possible to easily and to visually determine the location of the interface between the plasma and the packed red blood cells. Hence, there continues to be a need to be able to dynamically detect the position of this interface while the two housings of the centrifuge are being rotated.

SUMMARY OF THE INVENTION

In accordance with the invention, there are provided, an apparatus and method for acquiring selected information from a moving member and collecting that information at a fixed location for subsequent processing. The acquired information could be displacement as well as velocity-related information. The apparatus includes a source of radiant energy, means for transmitting a portion of the radiant energy to the moving member, and a plurality of reflector elements affixed to the moving member. These elements reflect a portion of the incident radiant energy to the fixed location where it can be detected. An electrical signal can be generated, proportional to the velocity of the moving member, in response to the reflected radiant energy.

In a particular apparatus in accordance with the invention, the transmission means can be a bidirectional fiber-optic member. Radiant energy can be transmitted to or received from the moving member via the fiber optic-member.

The reflector elements can be a plurality of mirrors spaced-apart and affixed to the moving member. The mirrors are separated by non-reflecting members. Radiant energy reflected off of the mirrors is transmitted to the fixed location by the fiber-optic member as a series of radiant energy pulses. A detector converts the series of radiant energy pulses to an electrical pulse train. The rate of the pulse train is proportional to the rotational velocity of the moving member.

Control circuitry can compare the rate of the pulse train to a set-point value corresponding to a pre-determined velocity. An error signal, corresponding to the difference therebetween, can be used to drive velocity control circuitry. The velocity control circuitry can be used to adjust the rotational velocity of a prime mover, an electric motor, coupled to the moving member.

Alternately, a proportional-integral-differential control system could be used. This system provides for control of the displacement of the moving member.

In yet another apparatus in accordance with the invention, the reflector elements can include elements of two different colors, such as red and green. If the different colored elements are alternately positioned along the movable member and if separate detectors are provided for reflected red and reflected green light, two sets of pulse trains can be generated. The two sets of pulse trains can be processed, as is known in the art, to determine direction of movement in addition to velocity.

The apparatus of the present invention is especially useful in combination with first and second rotatable members. In this combination, the first member rotatably supports the second member. It is desired to rotate the second member at a rotational velocity twice that at which the first member is rotated.

In accordance with this embodiment of the invention, a ring of reflective members is affixed to a region of the second member. A bidirectional, light transmitting member extends through the axis of rotation of the first member and is positioned with an end adjacent the ring affixed to the second member.

A stationary source of radiant energy and a light sensor can be positioned adjacent an exterior end of the light transmitting member. Radiant energy is transmitted, via the transmitting member, to the reflecting ring on the second rotating member. Reflected radiant energy pulses return, via the transmitting member, and are sensed and converted to an electrical pulse train at the stationary detector.

The rate of the electrical pulse train is porportional to the rotational velocity of the second member. The rotational velocity of the second member can then be controlled as noted above.

In yet another embodiment of the invention, the fiber optic members can be replaced with a Dove prism. A Dove prism will rotate an image transmitted therethrough twice for each rotation of the prism. If the prism is positioned in the axis of rotation of the first member, it will project an image of a selected region of the second member onto the optical detector.

If the second member is rotating at twice the velocity of the first member, the transmitted image will be stationary when it impinges on the detector. If the relative velocity between the two members varies from the 2:1 relationship, the image will move relative to the detector.

A quadrature detector can be used to convert this movement to electrical signals. The electrical signals can be used to provide input to a control system which can then be used to control the relative speed of the two members.

Numerous other advantages and features of the present invention will become readily apparent from the following detailed description of the invention and the embodiments thereof, from the claims and from the accompanying drawings in which the details of the invention are fully and completely disclosed as a part of this specification.

DETAILED DESCRIPTION OF THE PREFERRED EMBODIMENTS

While this invention is susceptible of embodiment in many different forms, there are shown in the drawing and will be described herein in detail specific embodiments thereof with the understanding that the present disclosure is to be considered as an exemplification of the principles of the invention and is not intended to limit the invention to the specific embodiments illustrated.

Figures 1, 2:
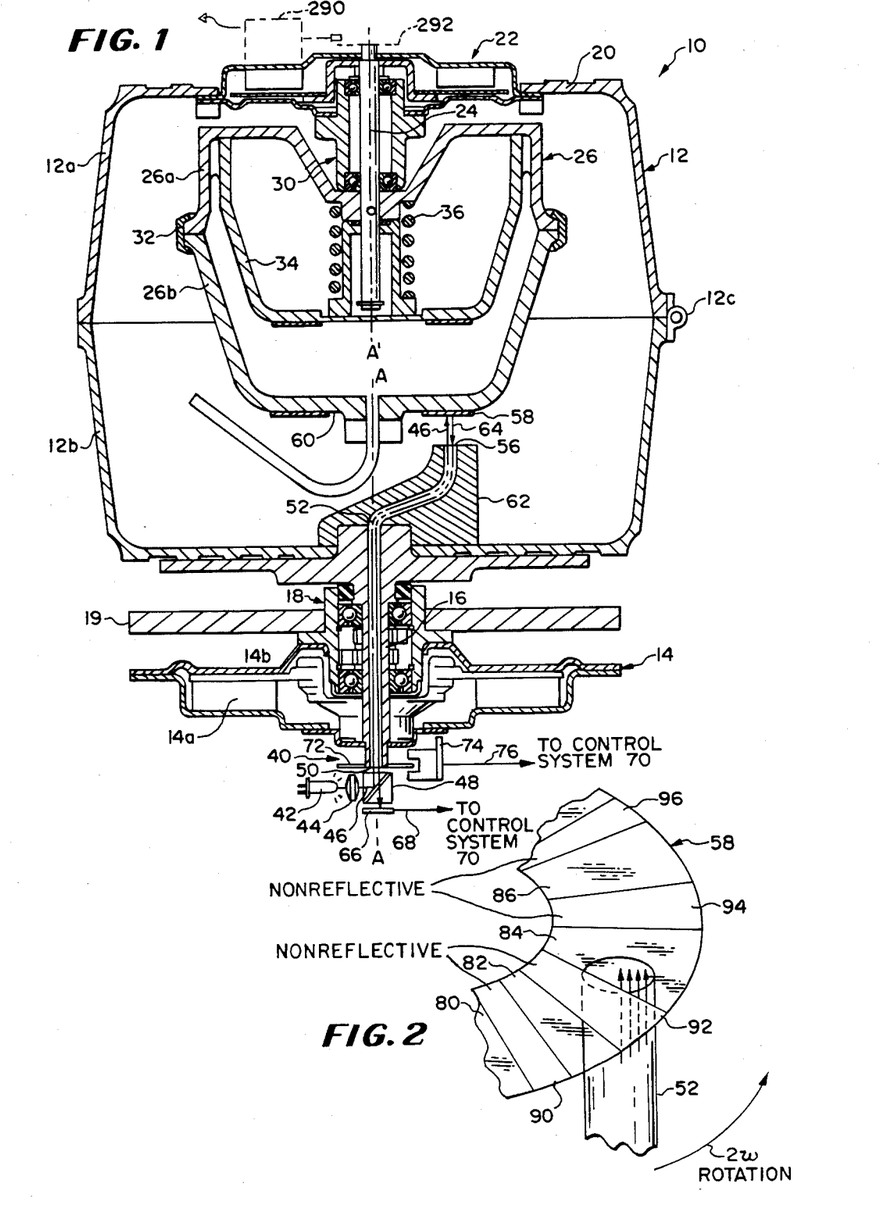
FIG. 1 is a view in section of an Adams-type centrifuge incorporating two independent drive motors and a fiber-optic based optical system in accordance with the present invention.
FIG. 2 is a fragmentary, enlarged schematic view of a data ring usable with the centrifuge of FIG. 1.

With respect to the figures, FIG. 1 illustrates a centrifuge 10 with an outer rotary housing 12 which is mechanically coupled to an electric drive motor 14. The motor 14 can be a commercially available, pancake-type motor. The motor 14 has a stationary magnet 14a positioned adjacent a pancake armature 14b. The motor 14 rotates the housing 12 about an axis A—A.

A hollow shaft 16 couples the armature 14b of the motor 14 to the rotary housing 12. The shaft 16 passes through a bearing structure 18 which provides rotary support for the housing 12. A stationary disk-shaped plate 19 is attached to the bearing structure 18 below the rotary housing 12.

The rotary housing 12 has an upper portion 12a which is coupled to a lower portion 12b by a hinge 12c. As is illustrated in the above incorporated Brown patent, the upper portion 12a of the housing 12 can be rotated from a closed position, as illustrated in FIG. 1 to an open position by rotation of the upper section 12a about the hinge 12c.

Affixed to an upper member 20 of the housing section 12a is a second pancake-type electric motor 22. The motor 22 has a shaft 24 which rotates about an axis A'-A. The axis A—A, A'—A' as illustrated in FIG. 1 coincide. Coincidence of the axis A—A, A'-A is not a requirement of the present invention. It would be within the spirit and scope of the present invention to space the axis A—A, A'—A' apart from one another.

Affixed to the shaft 24 is a second, inner, housing 26. The housing 26 is rotated within the housing 12 by the motor 22. A bearing structure 30 provides rotating support for the housing 26.

The inner housing 26 is also formed of two separable sections. An upper section 26a, as illustrated in FIG. 1, is affixed to the shaft 24. A lower, removable section 26b is removable affixed to the upper section 26a by a flexible clamp 32.

A spring loaded mandrel 34 is positioned within the housing 26. The mandrel 34 is downwardly biased, as illustrated in FIG. 1, by a biasing spring 36.

Further details of a mechanical nature of the centrifuge structure 10, are disclosed in the above-identified and incorporated Brown patent. It is important, as taught in that Brown patent, to rotate the inner housing 26 at twice the rotational velocity of the outer housing 12. It will also be understood that the housing 26 could be rotatably mounted above the housing 12 without departing from the spirit and scope of the present invention.

In order to provide for dynamically determining the rotary velocity or the speed of rotation of the housing 26 while the housing 12 is being rotated, an optical system 40 is provided. The optical system 40 includes a source of radiant energy, such as an electric light, 42 which generates a beam of radiant energy which passes through a lens 44. The focused light beam 46, after exiting the lens 44, enters a beam splitter 48. The purpose of the beam splitter 48 is to direct a portion of the beam 46 upwardly along the axis A—A and into an end 50 of a fiber-optic radiant energy transmitting member 52.

The fiber-optic member 52 functions as a bidirectional means for transmission of radiant energy. The fiber-optic member 52 is affixed to the hollow, rotating shaft 16 and centrally located with respect thereto along the axis of rotation A—A. As the shaft 16 rotates, and in turn rotates the housing 12, the fiber-optic member 52 also rotates.

Radiant energy 46 which is deflected off of the beam splitter 48 into the lower end 50 of the fiber-optic member 52 is transmitted with essentially little or no losses to an upper end 56. The upper end 56 is positioned within the housing 12 adjacent a selectively reflecting member 58. The reflecting member 58 is affixed to a lower surface 60 of the housing member 26b. The selectively reflecting member 58 can be thought of as a data ring.

Radiant energy which exits from the end 56 of the fiber-optic member 52 is directed toward the data ring 58. A mechanical support 62 positioned within the rotary housing 12 rigidly maintains the end 56 of the fiber-optic member 52 adjacent the data ring 58.

Radiant energy which exits from the end 56 and which falls upon the data ring 58 is selectively reflected off the data ring 58 back into the end 56. The reflected radiant energy 64 passes through the fiber-optic member 52, exits the lower end 50 thereof, passes through the beam splitter 48 and impinges upon a photo detection unit 66. The photo detection unit 64 is electrically coupled via lines 68 to control system 70.

Thus, as the housing members 12 and 26 rotate with respect to the fixed photo detector 66, a train of pulses of radiant energy, reflected off of the data ring 58, is transmitted through the fiber-optic member 52 and beam splitter 46 and impinges upon the photo detector 66. Information concerning the rotational velocity of the housing 26 with respect to the housing 12 may be collected and transmitted by the fixed photo detector 66 to the control system 70 for subsequent processing.

The speed of rotation of the shaft 16 of the outer electric motor 14 may be sensed by affixing a tachometer disk 72 to an end of the shaft 16. As the disk 72 rotates, a second detector 74 can be used to sense its speed of rotation and generate electrical pulses proportion thereto on line 76.

As will be discussed subsequently, one of the advantages of the apparatus of the present invention is that the rotational velocity of the housing 12 and the rotational velocity of the housing 26 may both be precisely controlled such that the housing 26 rotates at twice the velocity of the housing 12. Control is achieved by means of a closed loop system that does not utilize belts, gears and pullies as in many of the known prior art systems.

Since the speed of each of the motors 14 and 22 can be precisely and independently controlled, without the need of any mechanical linkages therebetween, the required mechanical tolerances of the system 10 are reduced. Further, the speed control of the motors 14 and 22 is not affected by mechanical wear of the type that might occur between gears, belts or other linkages if the two motors were mechanically coupled together.

With respect to FIG. 2, the data ring 58 is illustrated in detail. Data ring 58 is formed of a plurality of spaced-apart reflective members 80 through 86. The members 80 through 86 are spaced apart and affixed to the lower surface 60 in a ring about the axis of rotation A'—A'. Between each of the reflective members 80 through 86 is a non-reflective or blackened region 90 through 96. The beam of radiant energy is illustrated in FIG. 2 impinging upon a region of the data ring 58.

As the ring 58 rotates and the reflective members 80 through 86 pass over the beam 46, a portion of that beam is reflected back into the end 56 of the fiber-optic member 52 and is retransmitted through the beam splitter 48 into the detector unit 66. An electrical pulse train corresponding to the pulse train of radiant energy retransmitted through the member 52 is then generated on the lines 68.

While the members 80 through 86 are preferably high reflective mirrors, they could also be formed on the surface 60 by polishing the surface 60 and darkening alternate regions thereof, for example by anodizing, so as to form the members 90 through 96.

Figure 3:
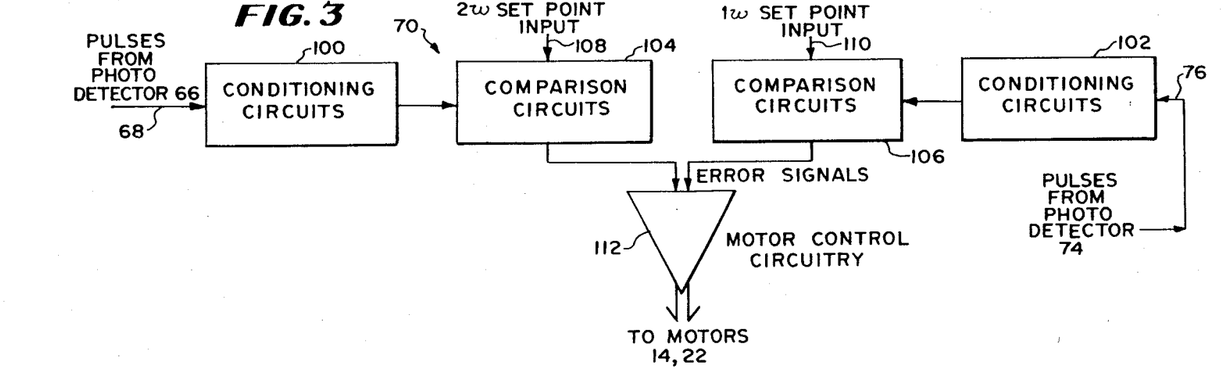
FIG. 3 is a block diagram of a velocity control system usable with the centrifuge of FIG. 1.

FIG. 3 illustrates schematically the control system 70. The control system 70 includes circuits 100 for conditioning the electrical pulses on the lines 68, corresponding to the relative rotational velocity of the housing 26 with respect to the housing 12. A second set of conditioning circuits 102 is coupled to the lines 76 to condition the electrical pulse train corresponding to the rotational velocity of the housing 12.

The conditioning circuits 100 and 102 provide, respectively, inputs to comparison circuits 104 and 106. Set point inputs 108 and 110 specify predetermined, desired, rotational velocities for the motors 22 and 14, respectively. Error signals from the comparison circuits 104 and 106 are amplified in a set of motor control amplifiers 112 so as to provide outputs to the two motors.

The control system 70 of FIG. 3 will provide velocity error signals to the amplifiers 112 so as to maintain the rotational speed of the housing 26 at twice the rotational speed of the housing 12. The data ring 58 will not provide any information as to direction of rotation of the housing 26.

As an alternate to the control system 70 of FIG. 3 which provides for velocity control of both motors 14 and 22, electrical energy can be supplied to motor 14 so that it will operate, open loop, at about its nominal rotational speed. Velocity feedback signals on the lines 76 can be used as the set-point input to the comparison circuit 104. the error signal input to the amplifiers 112 can then be adjusted to cause the motor 22 to operate at twice the rotational velocity of the motor 14.

While the control system 70 has been illustrated in block diagram form in FIG. 3, it will be understood that the exact implementation thereof is not a limitation of the present invention. For example, control system 70 could be implemented in hardwired form. Alternately, a commercially available micro-processor could be used to implement the control system 70.

It will also be understood that the control system of FIG. 3 could be implemented as a proportional-integral-differential (PID) system. In such an implementation, not only could the velocity of the inner housing 26 be controlled, but the relative displacement between the outer housing 12 and the inner housing 26 could also be precisely controlled.

Figure 4:
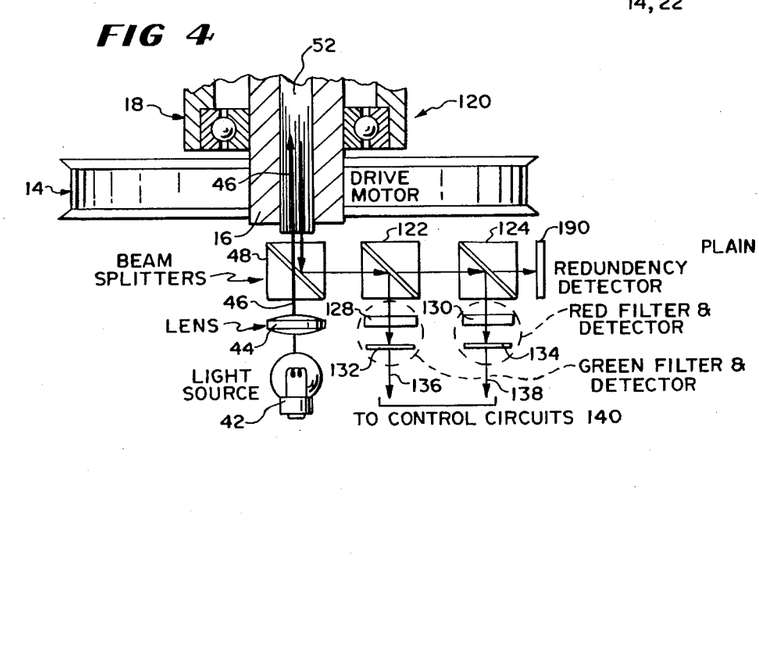
FIG. 4 is a fragmentary, sectional view of another centrifuge in accordance with the present invention.

FIG. 4 illustrates an alternate embodiment of the system 10. In FIG. 4, elements which correspond to the elements of FIG. 1 are given the same identification numerals. The system 120 of FIG. 4 includes the source of radiant energy 42 which generates visible white light, the beam splitter 48 which was present in the system 10 and two additional beam splitters 122 and 124. Associated with each of the beam splitters 122, 124 is a color-coated filter such as a green filter 128 and a red filter 130. Associated with each of the respective filters 128 and 130 is a corresponding optical detector 132 and 134. Outputs from the detectors 132 and 134 are coupled via the lines 136 and 138 to a control system 140.

The dual color detecting scheme of the system 120, as illustrated in FIG. 4, operates in conjunction with a data ring 142 which is affixed to the lower surface 60 of the housing 26b. The detectors 132 and 134 are adapted to generate an electrical pulse train in response to sensing a beam of a selected frequency. By means of the filters 128 and 130, selected sequences of green or red radiant energy pulses can be detected.

Figure 5:
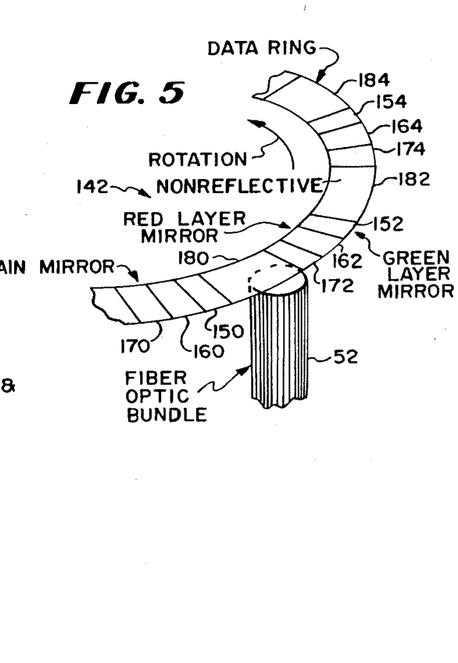
FIG. 5 is a fragmentary, enlarged schematic view of an alternate data ring usable with the centrifuge of FIG. 4.

The data ring 142, as illustrated in FIG. 5, includes a plurality of spaced-apart, green reflective regions 150 through 154. In addition, the ring 142 includes a plurality of spaced-apart, red reflective regions 160 through 164.

As the housing 26 rotates the incident beam 46 falls on the green reflective members alternately with falling on the red members. Green and red pulses of reflected radiant energy are transmitted back through the bidirectional member 52. The reflected green an red pulses pass through the respective green and red filters 128 and 130 and are detected by respective detectors 132 and 134. The sequence of detected red or green radiant energy pulses provides the same type of velocity information as is provided by the pulse train of the system 10 of FIG. 1. Additionally, since two sets of spaced-apart pulse trains are generated on the lines 136 and 138, the direction of rotation of the housing 26 can also be determined.

If desired, the data ring 142 can include reflective members 170 through 174 corresponding to the reflective members 80 through 84 of FIG. 2. The reflective members of the data ring 142 are also spaced apart by a plurality of non-reflective members 180 through 184. The light beam reflected off of the mirrors 170 through 174 can be sensed by the redundancy detector 190 if desired.

Figure 6:
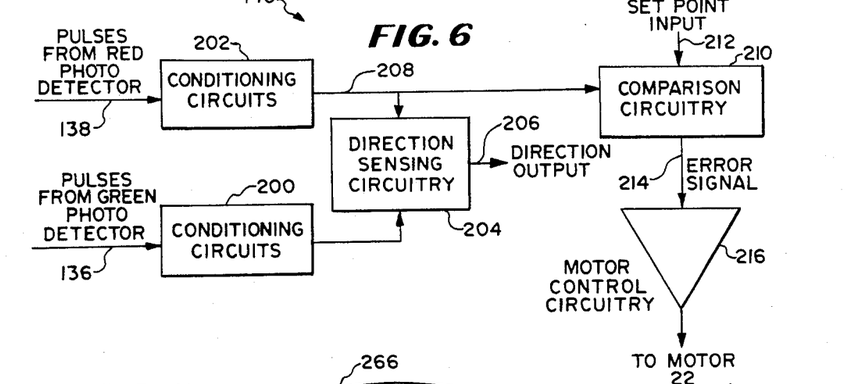
FIG. 6 is a block diagram of a portion of an alternate control system usable with the centrifuge of FIG. 4.

The motor control circuitry 140 of FIG. 6 illustrates that portion of the control circuitry necessary to adjust the speed of the motor 22. The speed of the motor 14 is still adjusted using the circuitry previously discussed in FIG. 3. Pulses from the green photo detector 132 and the red photo detector 134 are conditioned by circuits 200 and 202, respectively. Outputs from the conditioning circuits 200 and 202 are utilized by direction sensing circuitry 204 to generate a directional output on a line 206.

Analogously to the control system of FIG. 3, a pulse train generated by the conditioning circuits 202 on lines 208 provides inputs to comparison circuitry 210. The pulse rate corresponding to the pulses from the red photo detector 134 is compared to a set point input 212. An error signal is then generated on lines 214. The error signal on the lines 214 is a velocity error signal which provides input to motor control circuitry 216. The motor control circuitry 216 in turn can be used to adjust the rotational velocity of the motor 22.

Figure 7:
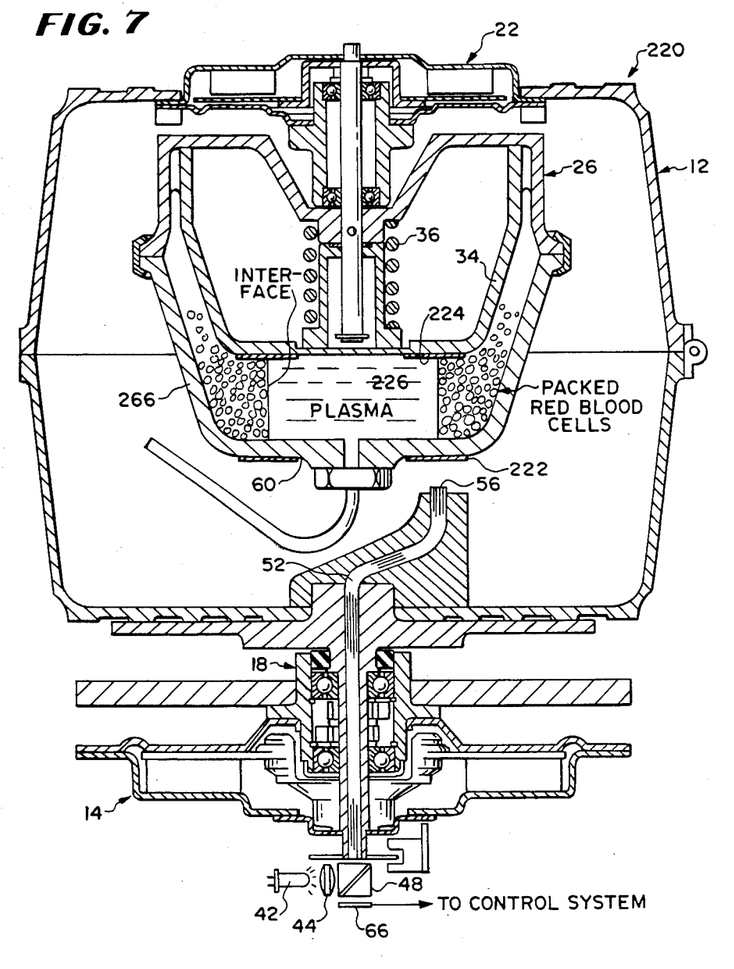
FIG. 7 is a fragmentary view in section, illustrating a centrifuge including a liquid interface sensor.

FIG. 7 illustrates yet another embodiment of the present invention. Elements of FIG. 7 which correspond to elements of FIG. 1 have again been given the same identification numerals. FIG. 7 illustrates a system 220, usable as discussed in the above-incorporated Brown patent for the purpose of separating blood into red blood cell and plasma components. As is described in the above-incorporated Brown patent, after the container of whole blood has been positioned between the mandrel 34 and the lower part 26b of the housing 26, as the housing 26 is rotated, the blood will separate into packed red blood cells and plasma. The separation into components is illustrated schematically in FIG. 7.

During the separation process, when the red blood cells have been driven to the sides of the housing 26b, as illustrated in FIG. 7, and away from the plasma component, a visible optical interface is present therebetween. By means of the system 220 this interface can be optically detected.

An optical system of the general type used in system 10 transmits a beam of radiant energy to a data ring 222 which is affixed to the lower surface 60 of the housing portion 26b. In the system 220, the lower housing member 26b would preferably be formed of transparent plastic material. The mandrel 34 has a highly-polished, mirrored surface, or a mirror 224 is affixed to a lower surface 226 generally above the data ring 222. The mirrored surface, or the mirror, 224 could be formed as a circular ring on the lower surface 226 of the mandrel 34.

As illustrated in FIG. 7, the interface between the plasma and the packed red blood cells is located between the data ring 222 and the reflecting surface or mirror 224. Radiant energy from the fiber-optic member 52 will pass through the region of plasma to the mirrored surface 224 but will not pass through the packed red blood cells. Hence, provided the data ring 222 has a transparent region or regions, radiant energy from the end 56 of the fiber optic member 52 can be transmitted through the transparent region or regions of the data ring 222, and then through the plasma provided the interface is located as shown in FIG. 7 to impinge upon the mirrored surface 224.

The radiant energy that impinges on the mirrored surface 224 will be reflected back through the plasma, through the data ring 222 and back through the fiber-optic member 52 to the detector 66 where it will be converted to a usable electrical signal. The electrical signal corresponding to the liquid interface being positioned between the data ring 222 and the mirrored region 224 can be used to operate valves and/or visual indicators for purposes of operator control.

Figure 8:
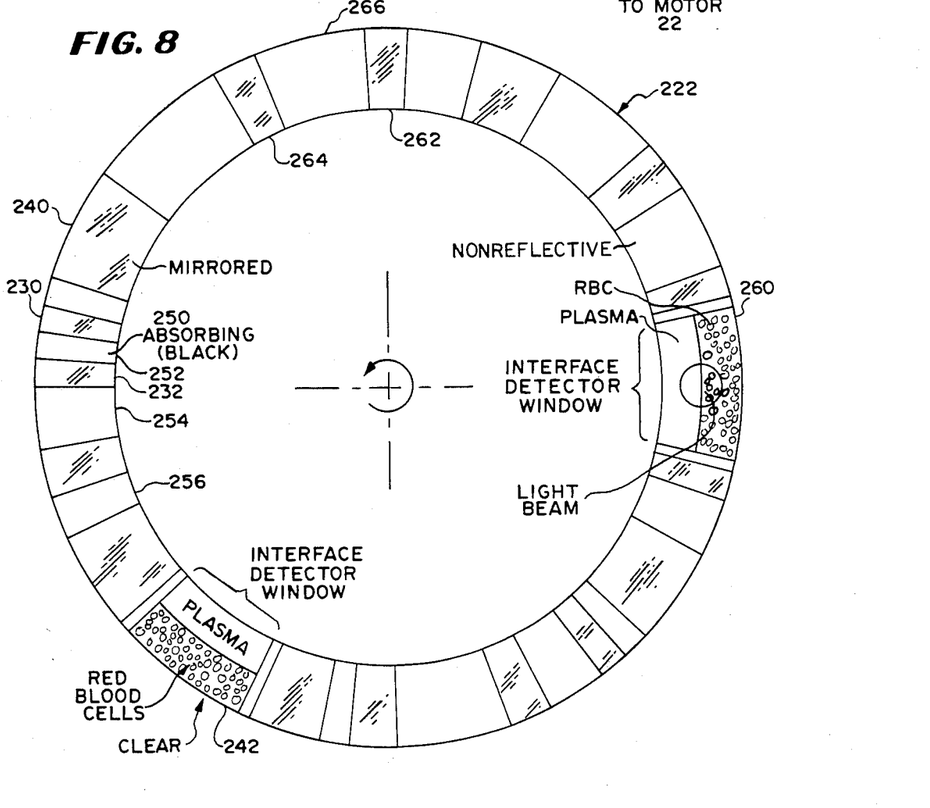
FIG. 8 is a plan view of an alternate data ring usable with the centrifuge of FIG. 7.

FIG. 8 illustrates the exemplary data ring 222. The data ring 222 can include a plurality of spaced-apart reflecting members such as the members 230 and 232. The members 230 and 232 correspond to the spaced-apart members 80 through 86 of FIG. 2 and can be used to determine the rotational velocity of the housing 26. A longer mirrored region 240 can be provided for the purpose of generating a start or strobe signal to be used by the control system. Further, a clear region 242 can be provided wherein the interface between the plasma and the red blood cells will appear and can be detected. The precise location of the interface between the plasma and the packed red blood cells, with respect to the clear region 242, will vary the amount of radiant energy or light reflected from the mirrored surface 224.

As illustrated in FIG. 8, the reflecting members and the clear member 242 can be spaced apart by a plurality of black or absorbing regions 250 through 256. In addition, the data ring 222 can be provided with additional clear regions such as the region 260. Further, mirrored regions of various sizes such as the regions 262 and 264 can be provided to generate special control signals. The regions 262 and 264 can be spaced apart by non-reflective regions such as the region 266, which are substantially longer than the non-reflective regions 250 through 256.

In addition, if desired, the data ring 222 could be provided with a plurality of spaced-apart red or green reflective regions as in the data ring 142 of FIG. 5. In this configuration, in addition to sensing the presence or absence of the interface between the plasma and the red blood cells, the direction of rotation of the housing 26 can also be determined.

Figure 9:
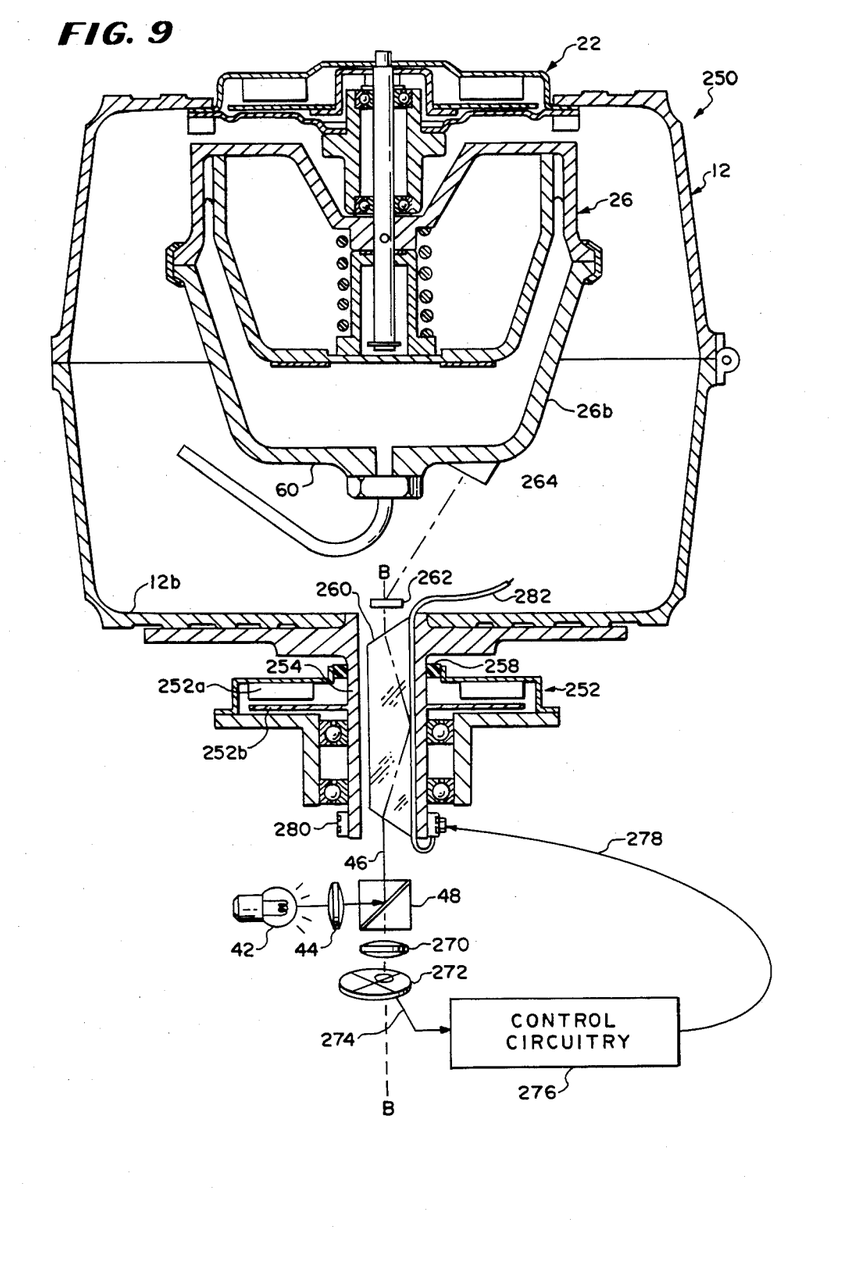
FIG. 9 is a view in section of an Adams-type centrifuge incorporating two independent drive motors and a prism based optical system in accordance with the present invention.

Yet another alternate embodying the present invention is illustrated in FIG. 9. A system 250 includes the dual, rotatably mounted housings 12 and 26. The exterior housing 12 is rotated by a pancake motor 252. The motor 252 includes a fixed ring magnet 252a and a rotatable pancake amature 252b.

The armature 252b is mechanically affixed to a rotatable, hollow shaft 254 which rotates about an axis B—B. The shaft 254 is mechanically affixed to the lower portion 12b of the housing 12. A bearing assembly 256 rotatably supports the shaft 254.

The motor 252, in FIG. 9, is positioned above the bearing assembly 256. A seal 258 is positioned between the rotatable shaft 254 and the motor 252. While the bearing assembly 256 is located below the motor 252 in the system 250, as opposed to the arrangement of FIG. 1 wherein the bearing assembly 18 is located above the motor 14, it will be understood that the exact arrangement of the bearing assembly with respect to the exterior motor is not a limitation of the present invention.

A Dove prism 260 is positioned within the hollow shaft 254. The optical axis of the Dove prism 260 corresponds to the axis of rotation B—B of the shaft 254.

The source of radiant energy 42 and focusing lens 44 generate the beam of radiant energy 46. The beam of radiant energy 46 is bent 90 degrees by the beam splitter 48 and directed along the axis B—B into the Dove prism 260.

When the beam 46 exits the prism 260, it passes through a deflecting lens 262. The lens 262 deflects the beam 46 so that it is incident on a mirror 264 which is affixed to a lower surface 60 of the lower housing portion 26b.

Radiant energy reflected off of the mirror 264 returns to the lens 262 and impinges upon the prism 260. The beam travels along essentially the same path, exiting at the lower end of the prism 260. The reflected beam then passes through the beam splitter 48, through a focusing lens 270, and impinges upon a quadrature detector 272.

The image reflected onto the quadrature detector 272 causes that detector to generate electrical signals in response thereto. Those electrical signals generated by the quadrature detector 272 on lines 274 can be used as inputs to a control system or control circuitry 276.

It is a recognized characteristic of Dove prisms that if the prism is rotated about its optical axis once, an image transmitted therethrough will be rotated twice. In the present instance, if the members 26 and 12 have the desired 2:1 velocity relationship for each rotation of the dove prism 260, the mirror 262 will have rotated twice. Hence, the image incident on the quadrature detector 272 will appear to be stationary. Any variation in the 2:1 rotational velocities between the housings 26 and 12 will manifest itself in movement of the image on the quadrature detector 274 in one direction or another.

Movement of the image on the quadrature detector 272 will cause a change in the electrical signals on the lines 274 which can be sensed by the control circuitry 276. Output from the control circuitry 276 on the lines 278 can be communicated to the upper motor, corresponding to the motor 22 of FIG. 1, via a set of slip rings 280 affixed to the rotatable shaft 254. Leads 282 located within the rotary housing 12 can be coupled to the upper motor 22 for the purpose of providing electrical control signals thereto. The control circuitry 276 can be the general type as illustrated in FIG. 3. In this embodiment, the set point input on the lines 108 would correspond to a desired reflected image position on the quadrature detector 272. Alternately, the control system 276 could be implemented as the above-noted proportional-integral-differential control system.

FIG. 10 is a further illustration of the characteristics of the dove prism. The use of the dove prism 260 in the system 250 provides a solid state stroboscope which generates a stationary image on the quadrature detector 272 when the upper housing 26 is rotating at exactly twice the rotational velocity of the outer housing 12.

Figure 10A:
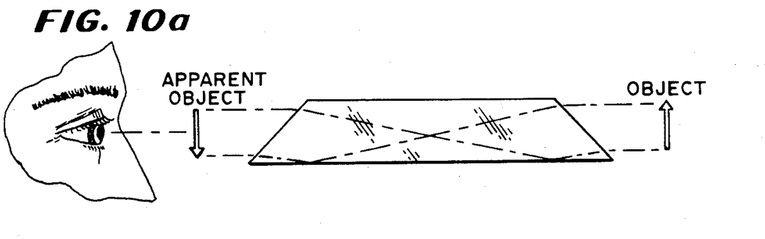
FIGS. 10, 10b, 10c, 10d and 10e are schematic views partly in perspective illustrating various optical characteristics of the prism of FIG. 9.
Figures 10B, 10C:
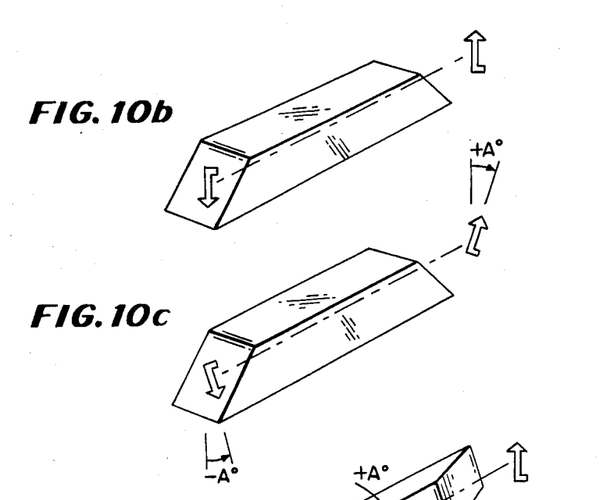
Figures 10D, 10E:
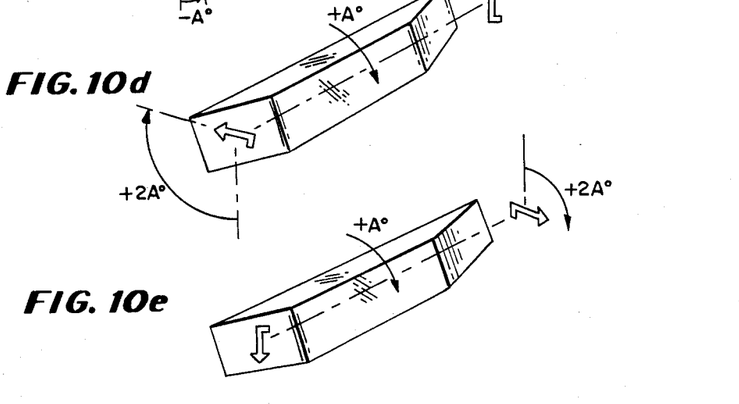

FIG. 10a depicts a Dove prism which is nothing more than a right angle prism with its point cut off. An object viewed through a Dove prism appears to be inverted in one axis but not the other —much like a mirror except that the mirroring effect is in line as opposed to reflex. FIG. 10b illustrates the effect. An object arrow appears inverted when viewed through the Dove prism. If the object is rotated through some angle "A", it appears to be rotated in the opposite direction when viewed through the prism as shown in FIG. 10c. If the object remains stationary and the prism is rotated through some angle "A", the object appears to rotate through an angle "2A" in the same direction as illustrated in FIG. 10d. Finally, it has been observed and can be mathematically shown that if the object is rotated through an angle "2A" while the prism is rotated through an angle of just "A" as shown in FIG. 10e, the object does not appear to rotate at all.

In yet another alternate instead of an optical system, a transmitter 290, indicated in phantom affixed to the top of the motor 22 of FIG. 1 could be used to transmit velocity information to a fixed location. Velocity information concerning the speed of rotation of the housing 26 could be generated by affixing a tachometer disk 292, also shown in phantom, to the shaft 24. Similarly, the location of the optical interface between the plasma and the packed red blood cells could be detected and transmitted to the fixed location.

The transmitter 290 could be an infra-red or a radio-frequency transmitter. A stationary receiver, outside of the housing 12, could be used to detect the transmitted signals. The detected signals could be converted to electrical signals and supplied to a control system such as the control system 70.

It will be understood that the exact form of the source of radiant energy 42 is not a limitation of the present invention. For example, the source 42 could be an incandescent lamp. In this instance, the beam of radiant energy 46 would be a beam of visible light.

From the foregoing, it will be observed that numerous variations and modifications may be effected without departing from the true spirit and scope of the novel concept of the invention. It is to be understood that no limitation with respect to the specific apparatus illustrated herein is intended or should be inferred. It is, of course, intended to cover by the appended claims all such modifications as fall within the scope of the claims.

What is claimed is:

1. An apparatus for acquiring selected information from a moving member and collecting that information at a fixed location for subsequent processing, the moving member being adapted to carry a fluid and to separate that fluid into at least two components, comprising:
   a source of radiant energy;
   first means for transmitting, at least a portion of the radiant energy, to a location adjacent the moving member and for directing a portion thereof against a selected region of the moving member;
   means affixed to the selected region, for selectively reflecting the incident portion of the radiant energy including an optically transparent region therein; and
   means for detecting at least a part of the reflected radiant energy and for generating an electrical signal related to the velocity of the member including means for sensing the presence of an interface between the two components adjacent said optically transparent region.

2. An apparatus as in claim 1 including:
   second means for transmitting the reflected radiant energy to the fixed location.

3. An apparatus as in claim 1 wherein said means for generating said velocity related electrical signal is positioned at the fixed location.

4. An apparatus as in claim 2 wherein said first transmitting means includes a fiber optic member.

5. An apparatus as in claim 4 wherein said second means includes a fiber optic member.

6. An apparatus as in claim 2 wherein said first and second means comprise a bidirectional, radiant energy transmitting member.

7. An apparatus as in claim 1 wherein said reflecting means includes a plurality of spaced apart, highly reflecting members.

8. An apparatus as in claim 7 wherein said reflecting members are selectively shaped mirrors.

9. An apparatus as in claim 7 including a plurality of essentially non-reflective elements interspersed with said reflecting members.

10. An apparatus as in claim 1 wherein said reflecting means includes a first plurality of spaced apart members of a first selected color.

11. An apparatus as in claim 10 wherein said reflecting means includes a second plurality of spaced apart members of a second selected color.

12. An apparatus as in claim 11 wherein members of said first plurality are interspersed between members of said second plurality.

13. An apparatus as in claim 11 wherein said members of said first plurality are positioned adjacent members of said second plurality.

14. An apparatus as in claim 11 wherein members of said first plurality are positioned spaced apart from members of said second plurality.

15. An apparatus as in claim 11 including a plurality of essentially non-reflective elements interspersed between members of said first and said second pluralities.

16. An apparatus as in claim 11 wherein wherein said detecting means includes means for sensing first and second beams of radiant energy reflected respectively from said members of said first color and said members of said second color and for generating velocity related electrical signals responsive to at least one of said reflected beams.

17. An apparatus as in claim 6 wherein the moving member rotates with respect to the fixed location and wherein said reflecting means includes a circular, selectively reflecting ring affixed thereto.

18. An apparatus as in claim 17 wherein an end of said bidirectional member is positioned adjacent said circular ring such that radiant energy transmitted through said member to said end impinges on at least a selected region of said ring with at least a part of the incident radiant energy reflected back to said end and into said member.

19. An apparatus as in claim 18 wherein said detecting means includes means for generating an electrical signal in response to the radiant energy reflected back into said member.

20. An apparatus as in claim 19 including means for comparing the generated electrical signal to a set-point signal and for generating an error signal in response thereto.

21. An apparatus as in claim 20 wherein said generated signal has a rate proportional to the rotational velocity of the moving member and said set-point signal corresponds to a desired rotational velocity.

22. An apparatus as in claim 21 wherein the moving member is rotated by an electric motor and including first motor control means for causing the motor and the moving member to rotate at a first velocity in accordance with said set point value.

23. An apparatus as in claim 22 wherein said bidirectional member is mounted on a second rotating member.

24. An apparatus as in claim 23 wherein the second moving member is rotated by a second electric motor and including second motor control means for causing the second motor and the second rotating member to rotate at a second velocity, different from said first velocity.

25. An apparatus as in claim 22 including means for sensing a direction of rotation of the rotating member.

26. An apparatus as in claim 22 including means for sensing an interface between two fluids being rotated within the member.

27. An apparatus as in claim 24 wherein said first rotational velocity substantially corresponds to twice that of said second rotational velocity.

28. An apparatus as in claim 27 wherein said bidirectional member comprises a fiber optic member.

29. An apparatus as in claim 28 wherein said source of radiant energy generates visible light.

30. An apparatus as in claim 28 with said fiber optic member extending, at least in part, along an axis of rotation of said second member.

31. An apparatus for acquiring selected velocity information from a moving member and collecting that information at a fixed location for subsequent processing comprising:
a source of radiant energy;
first means for transmitting, at least a portion of the radient energy, to a location adjacent the moving member and for directing a portion thereof against a selected region of the moving member;
means affixed to the selected region, for selectively reflecting the incident portion of the radiant energy; and
means for detecting at least a part of the reflected radiant energy and for generating an electrical signal related to the velocity of the member;
second means for transmitting the reflected radiant energy to the fixed location; and
wherein said first and second means comprise a selected prism.

32. An apparatus for acquring selected information from a moving member and collecting that information at a fixed location for subsequent processing comprising:
a source of radiant energy;
first means for transmitting at least a portion of the radient energy to a location adjacent moving member and for directing a portion thereof against a selected region of the moving member;
means affixed to the selected region for selectively reflecting the incident portion of the radiant energy; and
second means for transmitting reflected radiant energy to the fixed location wherein said first and second means include a bidirectional, radiant energy transmitting member;
means for detecting at least a part of the reflected radiant energy and for generating an electrical signal related to the velocity of the member;
wherein the moving member to rotates with respect to the fixed location and wherein said reflecting means includes a circular, selectively reflecting ring affixed thereto with an end of said bidirectional member positioned adjacent said circular ring such that radiation energy transmitted through said member to said end impinges on at least a selected region of said ring with at least part of the incident radiant energy reflected back to said end and into said member
with said detecting means including means for generating an electrical signal in response to the radiant energy reflected back into said member
including means for comparing the generated electrical signal to a set-point signal and for generating an error signal in response thereto proportional to the rotational velocity of the moving member, said set-point signal corresponds to a desired rotational velocity
wherein the moving member is rotated by an electrical motor and including first motor control means for causing the motor and the moving member to rotate at a first velocity in accordance with said set-point signal;
including means for sensing an interface between two fluids being rotated within the member and wherein said interface sensing means includes an optically transparent region positioned in said ring.

33. An apparatus as in claim 32 wherein said interface sensing means includes selectively located means for reflection of radiant energy that has passed through the fluid interface.

34. An apparatus as in claim 33 wherein said interface sensing means includes means for detecting the reflected radiant energy that has passed through the fluid interface and for generating an electrical signal in response thereto.

35. An apparatus for acquiring selected information from a moving member and collecting that information at a fixed location for subsequent processing comprising:
a source of radiant energy;
first means for transmitting at least a portion of the radiant energy to a location adjacent moving member and for directing a portion thereof against a selected region of the moving member;
means affixed to the selected region for selectively reflecting the incident portion of the radiant energy; and
second means for transmitting reflected radiant energy to the fixed location wherein said first and second means include a bidirectional, radiant energy transmitting member;
means for detecting at least a part of the reflected radiant energy and for generating an electrical signal related to the velocity of the member;
wherein the moving member rotates with respect to the fixed location and wherein said reflecting means includes a circular, selectively reflecting ring affixed thereto with an end of said bidirectional member positioned adjacent said circular ring such that radiant energy transmitted through said member to said end impinges on at least a selected region of said ring with at least part of the incident radiant energy reflected back to said end and into said member
with said detecting means including means for generating an electrical signal in response to the radiant energy reflected back into said member
including means for comparing the generated electrical signal to a set-point signal and for generating an error signal in response thereto proportional to the rotational velocity of the moving member, said set-point signal corresponds to a desired rotational velocity
wherein the moving member is rotated by an electrical motor and including first motor control means for causing the motor and the moving member to rotate at a first velocity in accordance with said set-point signal;
said bidirectional member is mounted on a second rotating member, wherein the second rotating member is rotated by a second electric motor and including second motor control means for causing the second motor and second rotating member to rotate at a second velocity, different from said first velocity, wherein said first rotational velocity substantially corresponds to twice that of said second rotational velocity and said bidirectional member comprises a selected prism affixed to the second rotating member with and optical axis aligned with an axis of rotation thereof.

36. An apparatus as in claim 35 wherein said prism rotates an image transmitted therethrough twice for each rotation of said prism.

37. An apparatus as in claim 36 wherein said detecting means includes means for sensing an optical image transmitted through said prism and for sensing movement of the transmitted image.

38. A method of acquiring selected information from a moving member adapted to carry and to separate a selected fluid into at least two components, the method comprising:
moving the member;
separating the fluid into at least two components with an interface therebetween;
generating a beam of radiant energy;
directing the beam of radiant energy at a selected region of themoving member adjacent the interface;
selectively reflecting a portion of the beam to a fixed location;
sensing the reflected beam; and
generating an electrical signal related to the position of the interface in the region.

39. A method as in claim 38 including:
adjusting the velocity of movement of the member in response to the generated electrical signal.

40. A method as in claim 39 including:
rotating the member at approximately the predetermined velocity; and
adjusting the rotational velocity to substantially correspond to the predetermined velocity in response to the generated electrical signal.

41. A method as in claim 40 including:
directing the beam of radiant energy to the region of the rotating member at least in part along the axis of rotation of the member.

42. A method as in claim 41 including:
transmitting the reflected beam, at least in part, along the axis of rotation of the member.

43. A stoboscope usable to sense relative movement between first and second rotating members comprising:
a source of radiant energy;
bidirectional means for transmitting radiant energy in a first direction and for rotating an image transmitted through said means, opposite said first direction, said means affixed to the first member and rotatable about an axis of rotation of the first member for transmitting the radiant energy in said first direction to a region of the second member and for transmitting a reflected image back through said means, opposite said first direction, while simultaneously rotating the image; and
means for detecting the rotated image.

44. The stobosope as in claim 43 wherein:
as the second member rotates at twice the rotational velocity of the first member, said rotated image is stationary with respect to said detecting means and said detecting means generates a predetermined electrical signal in response thereto.

45. The stoboscope as in claim 44 wherein said transmitting means includes a Dove Prism.

46. The stoboscope as in claim 45 wherein said detecting means includes a quadrature detector.

47. The stoboscope as in claim 44 with said detecting means including means for sensing an interface between selected fluids being rotated within the second member.

48. The stoboscope as in claim 44 including means, coupled to said detecting means, for controlling the rate of rotation of the second member so as to maintain the rotated image stationary with respect to said detecting means.

49. The stroboscope as in claim 48 with said control means including means for sensing movement of the rotated image on the detecting means and for adjusting the rotational velocity of the second member in response thereto so as to minimize said movement.

50. An apparatus for controlling the speed of rotation of an inner housing rotatably supported by an outer housing with the outer housing rotated by an outer electric motor and the inner housing rotated by an inner electric motor carried by the outer housing, the inner housing carrying a fluid to be separated into at least two components by the rotation, the apparatus comprising:
   a source of radiant energy;
   reflective means, affixed to the inner housing;
   means for transmitting at least a portion of the radiant energy to a region of the inner housing so as to be incident on said reflective means;
   means for sensing radiant energy reflected from said reflective means and for generating an electrical signal responsive thereto;
   means for controlling the rotational velocity of the inner housing, with respect to the outer housing in response to the generated electrical signal and;
   means for sensing the presence of an interface between the two separated components.

51. An apparatus as in claim 50 wherein said reflective means includes a first plurality of spaced apart reflective members formed in a ring about an axis of rotation of the inner housing.

52. An apparatus as in claim 51 with said ring oriented with respect to said incident radiant energy such that said reflective members, one after the other, receive incident radiant energy as the inner housing is rotated.

53. An apparatus as in claim 52 wherein said sensing means is fixedly located exterior to said outer housing.

54. An apparatus as in claim 52 including means for sensing the rotational velocity of the outer housing.

55. An apparatus as in claim 52 wherein said transmitting means includes a fiber optic member located in part along an axis of rotation of the outer housing.

56. An apparatus as in claim 52 including second means, affixed to said outer housing, for transmitting reflected radiant energy to said sensing means.

57. An apparatus as in claim 56 wherein said first and said second transmitting means comprise bidirectional means for transmitting radiant energy.

58. An apparatus as in claim 57 wherein said bidirectional means includes a bidirectional fiber-optic member affixed to said outer housing and extending, at least in part, along an axis of rotation of said outer housing.

59. An apparatus for controlling the speed of rotation of an inner housing rotatably supported by an outer housing with the outer housing rotated by an outer electrical motor and the inner housing rotated by an inner electric motor carried by the outer housing, the apparatus comprising:
   a source of of radiant energy;
   reflective means, affixed to the inner housing;
   means for transmitting at least a portion of the radiant energy to a region of the inner housing so as to be incident on said reflecting means;
   means for sensing radiant energy reflected from said reflective means and for generating an electrical signal responsive thereto;
   means for controlling the rotational velocity of the inner housing, with respect to the outer housing in response to the generated electrical signal
   wherein said reflected means includes a first plurality of spaced apart reflective members forming a ring about an axis of rotation of the inner housing with said ring oriented with respect to said incident radiant energy such that said reflective members, one after the other, receive incident radiant energy as the inner housing is rotated
   including second means, affixed to said outer housing, for transmitting reflected radiant energy to said sensing means
   wherein said first and said second transmitting means comprise bidirectional means for transmitting radiant energy and
   wherein said bidirectional means includes a selected prism affixed to said outer housing and extending at least in part along an access of rotation of said outer housing.

60. An apparatus as in claim 59 wherein said prism is a Dove prism.

61. An apparatus as in claim 60 wherein said Dove prism projects a stationary reflected image onto said sensing means only when said inner housing has a rotational velocity twice that of said outer housing.

62. An apparatus as in claim 61 wherein said control means includes means for detecting movement of the image reflected onto said sensing means and means for adjusting the speed of rotation of said outer or said inner motor to minimize said movement.

63. An apparatus for controlling the speed of rotation of an inner housing rotatably supported by an outer housing with the outer housing rotated by an outer electrical motor and the inner housing rotated by an inner electric motor carried by the outer housing, the apparatus comprising:
   a source of of radiant energy;
   reflective means, affixed to the inner housing;
   means for transmitting at least a portion of the radiant energy to a region of the inner housing so as to be incident on said reflecting means;
   means for sensing radiant energy reflected from said reflective means and for generating an electrical signal responsive thereto;
   means for controlling the rotational velocity of the inner housing, with respect to the outer housing in response to the generated electrical signal
   wherein said reflected means includes a first plurality of spaced apart reflective members forming a ring about an axis of rotation of the inner housing with said ring oriented with respect to said incident radiant energy such that said reflective members, one after the other, receive incident radiant energy as the inner housing is rotated
   including second means, affixed to said outer housing, for transmitting reflected radiant energy to said sensing means
   wherein said first and said second transmitting means comprise bidirectional means for transmitting radiant energy and
   wherein said bidirectional means includes a selected prism affixed to said outer housing and extending at least in part along an access of rotation of said outer housing.

64. An apparatus as in claim 63 wherein said control means includes means for determining a direction of rotation of said inner housing.

* * * * *